Patented Aug. 9, 1949

2,478,431

UNITED STATES PATENT OFFICE 2,478,431

PROCESS OF PREPARING POLYVINYL ALCOHOL

Gelu Stoeff Stamatoff, Nutley, N. J., assignor to E. I. du Pont de Nemours & Company, Wilmington, Del., a corporation of Delaware No Drawing. Application June 7, 1946, Serial No. 675,315

1 Claim. (Cl. 260—91.3)

This invention relates to the preparation of polyvinyl alcohol and more particularly to a process for the alcoholysis of polyvinyl esters to polyvinyl alcohol having improved properties.

A substantial outlet for polyvinyl alcohol is in preparing polyvinyl acetals by condensing the alcohol with aldehydes. An important and large use of such polyvinyl acetals is in laminating plasticized sheets of these resins with glass sheets to form transparent safety glass. It is essential that polyvinyl acetal sheeting so used to characterized by high strength and good optical properties throughout a wide range of adverse weather conditions. That is, in addition to being colorless and free from haze and foreign contamination, such sheeting must be very strong and tough.

Methods heretofore employed in preparing polyvinyl alcohol have not yielded a product entirely satisfactory for making polyvinyl acetals of the quality desired in the fabrication of safety glass. Thus, alkali catalyzed alcoholysis of polyvinyl esters yields a polyvinyl alcohol having an undesirable color, and polyvinyl acetals made therefrom are characterized by the presence of haze and foreign contamination. Although acid catalyzed alcoholysis of polyvinyl esters yields a polyvinyl alcohol of improved optical properties, polyvinyl acetals made therefrom are inferior in strength characteristics when plasticized and fabricated into safety glass.

An object of this invention is to provide a process of preparing polyvinyl alcohol of improved quality. A further object is to provide a process of preparing polyvinyl alcohol which is particularly adapted for use in the manufacture of safety glass interlayer. A still further object is to provide a process of preparing polyvinyl alcohol of the high quality desired and especially suited for the manufacture of interlayer sheets of safety glass characterized by superior strength and excellent optical properties. Other objects will be apparent from the description of the invention given hereinafter.

The above objects are accomplished according to the present invention by heating a mixture comprising a substantially anhydrous aliphatic liquid alcoholic medium and an acid catalyst to a temperature of 50° C.–60° C., then adding a polyvinyl ester to this mixture at a substantially continuous and uniform rate throughout the initial 10%–20% period of the total alcoholysis reaction time while maintaining said temperature range, and further maintaining said temperature range at least until said reaction is substantially complete, the amount of acid catalyst being 1.0%–2.5% by weight of the total reaction mixture.

The following examples wherein the parts are by weight, unless otherwise specified, illustrate specific embodiments of this invention:

Example I 180 parts of anhydrous methanol and 4 parts of sulfuric acid were mixed and heated to a temperature of 59° C. Then this mixture was agitated while 60 parts of granular polyvinyl acetate was added at a continuous and uniform rate throughout a period of 45 minutes. With continued agitation the resulting mixture was maintained within the temperature range of 57° C.–59° C. until precipitation of polyvinyl alcohol was substantially complete, which required an additional period of about 195 minutes, i. e. a total alcoholysis reaction time of approximately 4 hours. The polyvinyl alcohol thus produced was recovered and washed with anhydrous methanol. This polyvinyl alcohol was uniform in particle size, exceptionally white and soluble in cold water.

Example II 400 parts of anhydrous methanol and 6.55 parts of sulfuric acid were mixed and heated to a temperature of 57° C.–59° C. Then this mixture was agitated while 100 parts of granular polyvinyl acetate was added at a continuous and uniform rate throughout a period of 35 minutes. With continued agitation, the resulting mixture was maintained within the temeprature range of 57° C.–59° C. until precipitation of polyvinyl alcohol was substantially complete, which required an additional period of about 205 minutes, i. e. a total alcoholysis reaction time of approximately 4 hours. The polyvinyl alcohol thus produced was recovered and washed with anhydrous methanol. This polyvinyl alcohol was comparable to that obtained in Example I.

It will be understood that the above examples are merely illustrative and that the invention broadly comprises heating a mixture including a substantially anhydrous aliphatic liquid alcoholic medium and an acid catalyst to a temperature of 50° C.–60° C., then adding a polyvinyl ester to this mixture at a substantially continuous and uniform rate throughout the initial 10%–20% period of the total alcoholysis reaction time while maintaining said temperature range, and further maintaining said temperature range at least until the alcoholysis reaction is substantially complete, the amount of acid catalyst being 1.0%–2.5% by weight of the total reaction mixture.

Following conventional procedures, polyvinyl alcohol prepared according to Examples I and II was condensed with butyraldehyde to polyvinyl butyral, the polyvinyl butyral plasticized and formed into sheets and used as interlayer in fabricating laminated safety glass. This safety glass possessed superior optical qualities, being unusually clear and free from haze and foreign contamination, and showed exceptional strength and toughness (as indicated in the table below) when tested according to accepted procedure. Obviously other aldehydes may be employed because the polyvinyl acetals in general prepared from the polyvinyl alcohol of this invention are characterized by improved properties.

The following table shows comparative strengths of laminated safety glass samples comprising polyvinyl acetal interlayer sheets made from polyvinyl alcohol prepared according to conventional procedure and laminated safety glass samples comprising polyvinyl acetal interlayer sheets made from polyvinyl alcohol prepared according to the present invention. In each case the same type and amount of plasticizer was used in forming the polyvinyl butyral sheeting.

| Method of preparing polyvinyl alcohol used | Alcoholysis Reaction Conditions | | | Polyvinyl Butyral Sheeting, Break Test, Ft. @ 0° F. |
|---|---|---|---|---|
| | Temperature, °C. | Time, Hrs. | Catalyst concentration, per cent by wt. of reaction mix | |
| Conventional | 61-65 | 3 | 2.08 | 24 |
| Do | 57-59 | 3 | 3.13 | 23 |
| Present Invention | 57-59 | 3.75 | 1.67 | 41 |
| Do | 57-59 | 3 | 2.08 | 35 |

The break test is a direct measure of interlayer strength and is conducted as follows:

A 12" x 12" x 0.025" plasticized interlayer sheet laminated between glass sheets is placed at the bottom of a testing tower in a jig which supports the four edges of the test sheet. A 0.5 lb. steel ball is dropped from various heights in the tower until the maximum drop at which no interlayer rupture occurs is determined. This height is recorded as the break test value.

An essential feature of this invention is the control of particle size of the polyvinyl alcohol. The quality of polyvinyl alcohol produced depends greatly upon the proper control of polyvinyl alcohol particle size. An important factor contributing to the desired uniform particle size of the polyvinyl alcohol is the addition of polyvinyl ester to the acid catalyzed alcohol reaction mixture over a specific part of the period of time of the alcoholysis reaction and the regulation of this addition. Thus it has been found necessary, in order to produce the high quality polyvinyl alcohol required by this invention, that the polyvinyl ester be added to the alcohol-catalyst mixture at a substantially continuous and uniform rate throughout the initial 10%–20% period of the total alcoholysis reaction time. Addition of the polyvinyl ester in substantially less than the time specified results in polyvinyl alcohol of fibrous quality. The purification and handling of this polyvinyl alcohol is accomplished only by unavoidable contamination which renders the alcohol unsuitable for use as an intermediate material in the manufacture of transparent safety glass grade polyvinyl acetal. Further, plasticized polyvinyl acetals made from polyvinyl alcohol having such large particles are non-uniform and too low in strength for safety glass interlayer sheets. Addition of the polyvinyl ester in substantially greater than the time specified results in polyvinyl alcohol of very fine particles which are too small for efficient purification and handling, e. g. difficulties encountered in washing these fine particles of polyvinyl alcohol result in contamination and general quality reduction of the alcohol which renders it unfit for use as an intermediate in the manufacture of safety glass grade polyvinyl acetal.

Further, it has been found that the production of high quality polyvinyl alcohol according to this invention desirable for use in the manufacture of safety glass grade polyvinyl acetals is dependent on close control of the temperature and the acid catalyst concentration in the alcoholysis reaction. While a temperature of 50° C.–60° C. is suitable, a temperature of 57° C.–59° C. is preferred. A temperature below about 57° C. results in a slower, although acceptable, rate of reaction. A temperature below 50° C. is impractical and unsuitable. The tendency is for polyvinyl alcohol of progressively inferior quality to result as the temperature substantially exceeds about 60° C. An acid catalyst concentration of 1.0%–2.5%, by weight of the total reaction mixture, is preferred. A catalyst concentration in excess of about 2.5% has practically the same effect on the quality of polyvinyl alcohol produced as does an excessive temperature, while a catalyst concentration below about 1.0% results in a slower rate of reaction which is commercially impractical.

Therefore, by the combination of steps including resorting to acid catalysis and the careful control of the alcoholysis reaction conditions an improved quality polyvinyl alcohol has been produced which is particularly well suited for the manufacture of safety glass grade polyvinyl acetals in that when laminated with glass sheets these polyvinyl acetals yield safety glass characterized by superior strength and improved optical properties.

In carrying out this invention it has been found that water exerts an inhibiting effect upon the alcoholysis reaction. While relatively small amounts of water (e. g. approximately the amounts normally contained in technical grade anhydrous chemicals) may be tolerated, it is preferred that all constituents entering into the reaction be as anhydrous as feasible. Therefore, the term "anhydrous" as used herein does not exclude the presence of such relatively small amounts of water.

Although the present invention has been described with particular reference to the methanolysis of polyvinyl acetate in the presence of a sulfuric acid catalyst, it is equally applicable to the alcoholysis of other polymeric vinyl esters, e. g. vinyl formate, vinyl propionate and vinyl butyrate, with other substantially anhydrous aliphatic liquid alcohols, e. g. ethanol, propanol and butanol, in the presence of other acid catalysts, e. g. hydrochloric acid, sulfonic acid and the like.

As many apparently widely different embodiments of this invention may be made without departing from the spirit and scope thereof, it is to be understood that the invention is not limited to the specific embodiments thereof except as defined in the appended claim.

I claim:

Process of preparing polyvinyl alcohol which comprises heating a mixture including anhydrous methanol and a sulfuric acid catalyst to a temperature of 57° C.–59° C., adding solid polyvinyl acetate to said mixture at a continuous and uniform rate throughout the initial 10%–20% period of the total alcoholysis reaction time while maintaining said temperature range, and further maintaining said temperature range until said reaction is complete, the amount of sulfuric acid catalyst being 1.0%–2.5% by weight of the total reaction mixture.

GELU STOEFF STAMATOFF.

REFERENCES CITED

The following references are of record in the file of this patent:

UNITED STATES PATENTS

| Number | Name | Date |
|---|---|---|
| 1,672,156 | Herrmann | June 5, 1928 |
| 2,109,883 | Herrmann | Mar. 1, 1938 |